July 14, 1964  F. SCHOPPE  3,140,862
APPARATUS FOR THE PHYSICAL AND/OR CHEMICAL TREATMENT
OF GRANULAR SOLIDS OR FINE DUSTS
Filed May 4, 1960  3 Sheets-Sheet 1
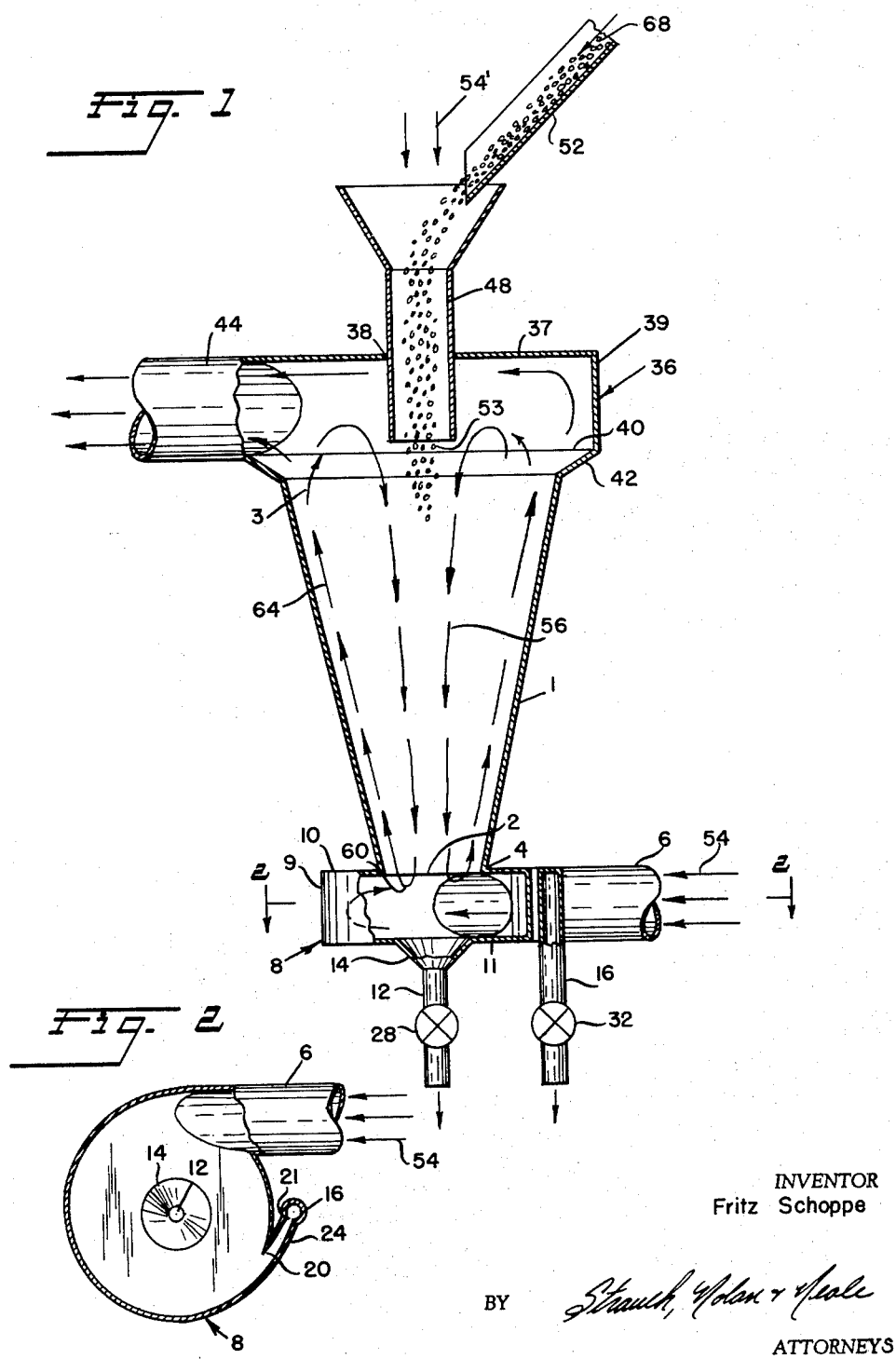
INVENTOR
Fritz Schoppe
BY
ATTORNEYS

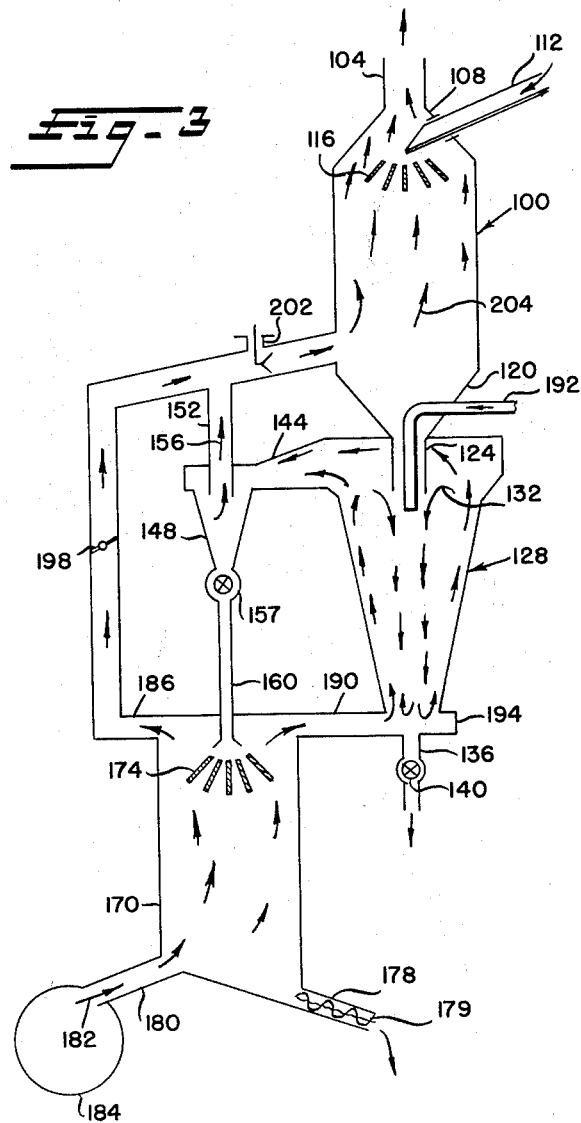

July 14, 1964  F. SCHOPPE  3,140,862
APPARATUS FOR THE PHYSICAL AND/OR CHEMICAL TREATMENT
OF GRANULAR SOLIDS OR FINE DUSTS
Filed May 4, 1960  3 Sheets-Sheet 3
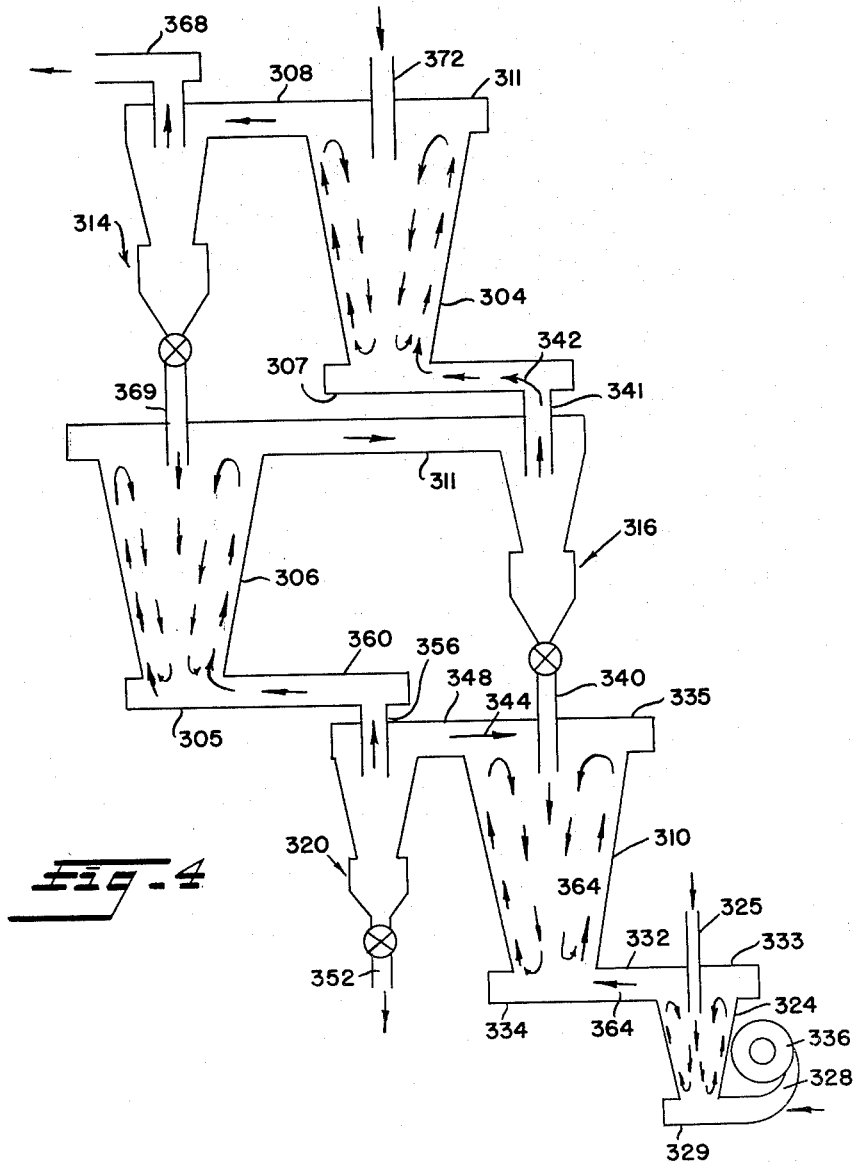
INVENTOR
Fritz Schoppe
BY
ATTORNEY United States Patent Office 3,140,862
Patented July 14, 1964

3,140,862
APPARATUS FOR THE PHYSICAL AND/OR CHEMICAL TREATMENT OF GRANULAR SOLIDS OR FINE DUSTS
Fritz Schoppe, Munich-Pasing, Germany, assignor to Metallbau Semler, G.m.b.H., Munich, Germany, a company of Germany
Filed May 4, 1960, Ser. No. 26,795
Claims priority, application Germany Oct. 6, 1958
11 Claims. (Cl. 263—21)

The present invention relates to method and apparatus for the treatment of solids in granular and/or fine dust form. More particularly, it relates to the treatment of small particles of solids, e.g., granules or a dispersed suspension of very small particles of a dust-like nature in a fluid carrier, by means of gases or vapors, in connection with which the solid particles undergo a chemical or physical reaction with said gases or vapors.

This application is a continuation-in-part of copending application Serial No. 845,301, filed October 5, 1959, now abandoned, and utilizes the invention described and claimed in applicant's copending application Serial No. 412,859, filed February 26, 1954, now Patent No. 2,935,840, which involves a method of and apparatus for producing a violent constant turbulence designated as S–L turbulence.

Subjecting solids, particularly those in dust form, to heat treatment, such as in a drying or burning process for example, in previously known apparatus has been very difficult due to the fact that each of the small size particles lack sufficient speed of descent to effect countercurrent heat exchange. This is particularly true in the so-called "pebble heater" treatment of most substances of very small particle sizes, such as those 0.5 mm. diameter or less. Also, mixing and combustion chambers heretofore used have not provided an adequate means for thoroughly mixing finely granulated material either with a heat carrier or with a fuel to be combusted, and furthermore, previously known mixing systems have not provided an efficient method of exposing finely granulated material to a heat carrier wherein said material is thoroughly mixed with the heat carrier and wherein the heat carrier is exposed again to other finely granulated material after separation from the first granulated material to which it was exposed. Thus, heat produced for the purpose of treating finely granulated material in such systems has not in the past been efficiently utilized.

The improved apparatus and process of the present invention overcomes the above problems, as well as many others, by employing an improved mixing and combustion chamber, the basic principles of which are the subject of aforementioned application Serial No. 412,859, now U.S. Patent No. 2,935,840. The chamber wil provide a zone of S–L type turbulence created between substantially parallel paths of fluid in a system for treating granulated or dust material as will be fully described hereinafter.

Accordingly, a primary object of the present invention resides in the provision of a novel and improved mixing and reacting apparatus wherein the above stated problems as well as many others, are obviated.

Other objects of the present invention reside in the provision of:

A novel treating system wherein the improved mixing and reacting apparatus is employed in various material treating processes;

A novel treating system wherein the improved mixing and reacting apparatus is associated with a heat source and raw material source;

A novel combustion process for a material wherein heat employed in the process is efficiently utilized;

A novel heat treating process wherein finely granulated material or sludge is exposed to a heated medium and wherein the mixing and reacting apparatus of the present invention is employed in at least one phase of said process;

A novel process and novel apparatus for subjecting granulated or grit-like solids to heat treatment, such as in the burning of cement;

A novel system and novel process for the heat treatment of a granular material where the material to be treated is subjected to desired heat, for example, in a combustion chamber, and is also subjected to at least one heat exchange phase utilizing carrier gas from the heating phase preceding or following the combustion chamber in said system;

A novel heat treating process wherein steps are taken to enhance the heat balance, such as by short-circuiting gas currents, adding ballast substances, or introducing additional firing fuels at desired places in the heat treating apparatus;

A novel plural stage process for the heat treatment of solids in dust form utilizing the mixing and reacting apparatus of the present invention, in which process a chemical or physical reaction takes place between the solids and the gases flowing through the apparatus, in at least one of said stages; and A novel method and apparatus for exposing solid materials to a fluid medium for a certain period of time, including separating the properly treated and improperly treated material by expelling separated fractions from different locations.

Further objects and advantages will become apparent from the following description and the appended claims taken in conjunction with the accompanying drawings showing preferred exemplary embodiments thereof, in which:

FIGURE 1 is a view partially broken away and partly in section of a single stage mixing and reacting apparatus in accord with the present invention;

FIGURE 2 is a section view through the mixing chamber inlet taken along line 2—2 of FIGURE 1;

FIGURE 3 is a diagrammatic illustration of a multiphase heat treating system embodiment, utilizing the apparatus of FIGURE 1; and FIGURE 4 is a diagrammatic illustration of still another heat treating system, particularly useful in dust treatment and embodying a multistage arrangement of reacting chambers similar to the apparatus of FIGURE 1.

Briefly, the preferred mixing and reaction chamber of the present invention comprises a hollow tubular body with smooth walled interior surface, the body being arranged with its axis vertical and having created therein, a zone of S–L turbulence which effectively mixes two substances introduced into said chamber, normally at opposite ends of said chamber. For a more detailed description of S–L type turbulence and theory, and chambers for producing the same, reference is made to applicant's copending application Serial No. 412,859, filed February 26, 1954 now Patent No. 2,935,840.

Referring to FIGURE 1, a basic exemplary mixing and reaction apparatus embodiment comprises a hollow treating chamber 1, arranged with its axis vertical, having an inlet opening 2 at the bottom end and an outlet opening 3 at the opposite end. Chamber 1 is at least as wide as inlet opening 2 throughout its length, and preferably diverges from its bottom end 4 in a frustoconical shape as shown in FIGURE 1 and, for optimum operation it must have a length of uninterrupted interior surface at least one and one-half times its average diameter, to provide the necessary flow paths to develop S–L turbulence.

The apparatus includes an inlet conduit 6 passing tangentially into the peripheral wall of a volute 8 which in turn is secured to the bottom (or inlet) end 4 of chamber 1, the volute outlet being coextensive with chamber opening 2. Volute 8 has a vertical side wall 9 and transverse top and bottom walls 10, 11 respectively. Opening 2 of chamber 1 occurs at a clean intersection of inlet volute 8 and the smooth interior surface of the frusto-conical wall of chamber 1. There must be no portion of the volute top wall 10 extending radially inwardly past the chamber entrance 2, as this would create an undesired Blasius type turbulence and prevent development of S-L turbulence within the chamber.

A discharge tube 12 (for a purpose to be described) extends downwardly from the center of volute 8 substantially at a right angle to the volute bottom wall 11 and a second discharge tube 16 extends in the same manner at a location adjacent the periphery of the volute. The upper section of the center discharge tube 12 is preferably made in the form of a funnel 14 to aid in entry of material to the tube 12. The second discharge tube 16 communicates with the volute 8 through a tangential peripheral passage 20 which has a height dimension the same as that of the volute peripheral wall 9 and tapers in width from wall 9 to a side inlet opening 21 in the discharge tube 16. The outer wall of passage 20 is preferably an extension 24 of volute wall 9, enabling the passage 20 to divert heavy solid granules, which fall into the volute 8 and pass by centrifugal force to the volute periphery, to the upper end of the second discharge tube 16.

Each of the discharge tubes 12 and 16 has an outlet control device 28, 32 respectively, which may be any suitable form of valve which will permit passage of particulate material or waste sludge or slag depending upon the process in which the reaction chamber 1 is employed, as will be hereinafter described.

At the top of treating chamber 1 is an outlet volute 36 which consists of a horizontal top wall 37 having a central through opening 38, a vertical side wall 39 and an open bottom 40, the latter opening receiving the discharge from the outlet end of chamber 1. The inlet 40 (open bottom side) of volute 36 is preferably connected to chamber 1 by a frusto-conical strip 42 having a wider angle of divergence than does chamber 1, and an outlet volute discharge conduit 44 is located in the outer peripheral surface of the volute 36.

A chamber loading hopper 48, secured in the central opening 38 of the outlet volute upper wall 37, is disposed to receive material to be treated from a material feed chute 52 which can be secured to the hopper by suitable means such as welding. Hopper 48 extends concentrically through volute 36 with its outlet end 53 terminating at a position near the upper end of treating chamber 1 where it may deliver granulated material into the chamber fluid return flow path shown by the innermost arrows at 56, as will be described. The loading hopper 48 and feed chute 52 constitute one example of an inlet feed means for introducing material to be treated into the treating chamber 1 and, as will be seen hereinafter, such means may vary with the process involved.

It has been discovered that by using the described vertically arranged mixing chamber, it is possible to mix and also react very finely granulated solids or dusts with gas flowing through the chamber in which conection novel secondary effects occur.

When a gas 54 is introduced through conduit 6 to the inlet volute 8 it acquires and retains a swirling movement as it passes from the inlet volute 8 into the small end chamber 1. This gas flowing in a substantially helical path will flow upwardly, as indicated by arrows 64, toward the wider end 3 of the chamber wall. A flow reversal occurs at chamber end 3 and passes into a return flow, indicated by arrows 56, in the vicinity of the central vertical axis of chamber 1. The return flow path is a zone passing from the outlet cross section of the frusto-conical chamber to adjacent its inlet (or lower) cross section, at which point any remaining flow then passes radially outwardly as indicated by arrows at 60, and then passes upwardly together with the upward flow of the outer zone of gas near the wall of chamber 1. The S-L turbulence occurs between the inner and outer zones of oppositely flowing gas. Such turbulence is highly violent, is constant over substantially the entire range of Reynolds numbers, and creates substantially complete mixing of the gas and any material introduced into the gas. The intermediate turbulent mixing zone is annular, occupies the major portion of the interior of the chamber and is being continuously fed by the oppositely flowing inner and outer zones of fluid or gas. Accordingly, completely mixed material from the turbulence zone must pass out of the chamber and the exit flow is permitted only at the upper end 3 into the outlet volute 36 and thence to discharge conduit 44. A volute outlet of this type permits efficient recovery of the swirling flow of exiting gases and other materials.

The return flow 56 is created by a differential of low pressures in the center of the chamber, extending from the chamber outlet 3 to the inlet 2 where the pressure is extremely low. This differential of low pressures at the chamber core enhances the introduction of material 68 into the upper end of the chamber core through the hopper outlet 53 to be mixed with gas 54 within chamber 1.

The zone of turbulence (S-L type) is created between the outer zone of gas 64 flowing upwardly adjacent the wall of chamber 1 and the return flow indicated at 56 and is present between these fluid flow paths in the form of an annular frusto-conical zone of intense turbulence capable of very thoroughly mixing the gas flowing through the chamber with other substances introduced at a suitable point such as through hopper 48. If desired such turbulence can cause the materials being mixed to react with each other, as in a burning process. In particular, in this invention it is contemplated introducing other substances at the vertical axis of chamber 1 into the upper end of the return flow, as by means of hopper 48. The hopper may be of such shape as to draw a second smaller stream of gas into chamber 1 along with the solid particles.

Solid materials 68 introduced into the upper end of the return flow, at 53, will drop or flow downwardly in the direction of the vertical axis of chamber 1 accelerated by the return gas flow 56 and the attraction of gravity and, as a result of the rotary motion of the return flow at the axis of the chamber, is gradually distributed over the zone of turbulence and mixed. The centrifugal force effected by the rotary motion at the axis of the chamber gradually transports the solid particles further into the outer zones of chamber 1 where the particles are picked up by the upwardly directed forward flow emerging from inlet volute 8 and transported to the outlet of the treating chamber.

Due to the force of gravity, larger and thus heavier particles rise upwardly in the treating chamber more slowly than the small light particles. However, since large particles require a longer period of time than the small particles for any possible physical and/or chemical reactions with the stream of gas flowing through the chamber, this lag in speed of larger particles due to weight serves as a selective treatment of particles of different size and provides a desirable result of having the large particles achieve approximately the same degree of heating and exchange of material, or degree of reaction, as the smaller particles.

In accordance with the invention a second novel effect is also obtained due to the fact that large particles require a considerably greater gas velocity in the treating chamber to enable them to be discharged from the outlet volute 36. Therefore, if a suitable gas velocity is pre-established in the treating chamber 1, excessively large particles normally having an insufficient time of stay in the chamber for a complete treatment to be effected are not discharged from the chamber outlet. Instead they drop through the center of the treating chamber through the action of the return flow and by the force of gravity to inlet volute 8. Since the flow rotates intensively at the bottom of admission volute 8, the solid particles will be separated into two fractions, one on the bottom of said volute and the other around the periphery of the admission volute. The heavier portions of these coarse particles pass outwardly due to centrifugal force to the periphery of the inlet volute and are discharged through passage 20 into discharge tube 16 and thence through discharge device 32. The relatively finer portions of the coarse particles are, on the other hand, held together in the center of the volute by the stream of gas which strives toward the center of the volute and can be removed from this point through funnel 14, discharge tube 12, and discharge device 28.

Thus it will be seen that it is possible to remove from the stream of solid particles introduced into the treating chamber, those particles which, as a result of their oversize, cannot be satisfactorily treated in the chamber. Such removed particles may, of course, be added again to material 68 which is being fed into the upper end of chamber 1, after repeated grinding or other suitable treatment. The critical limit of the particle size of the solid particles removed from the flow and discharged through the discharge devices 28 and 32 is determined by the velocity of the gas which encounters solid particles tending to descend. The velocity of inlet air entering the treating chamber 1 may be controlled by any suitable means such as by controlling the speed of a blower (not shown) introducing gas 54 in volute 8.

Since the larger particles remain in chamber 1 longer than the small particles, the solid particles emerging from the outlet volute 36 have been heated and/or reacted, very thoroughly and uniformly. The apparatus as described is therefore particularly suitable for the treatment and production of high grade granulated solids or fine dusts.

As an exemplary process employing the mixing and reacting apparatus of the present invention, we can consider the drying of moist granulated material introduced through hopper 48 into the treating chamber. A stream of preheated gas 54 is introduced into inlet volute 8 and from there, into treating chamber 1 where the flow of preheated gas creates the highly violent S–L mixing turbulence. The velocity of the gas is regulated to permit heavy particles, which cannot be satisfactorily dried out in the treating chamber 1 during a predetermined period of stay due to their excessive size, to be removed from inlet volute 8 as described above. Thoroughly treated, or dried material is ejected from the treating chamber through outlet volute 36.

In other processes where solids to be treated have firmly adherent gaseous components, water of crystallization or carbon dioxide which are desired to be expelled from the solids by the elevated temperatures involved, such gaseous components may be expelled by velocity control of the gas and the oversize solids removed by the selective removal process as described above. In fact, any solid particles being of a different weight than the other components of the material being treated may be separated from the mass by this method.

The mixing and reacting apparatus of FIGURE 1 may be employed in processes involving chemical reactions, such as between a pulverulent solid and a stream of gas which occurs in the reduction of metal oxides, particularly iron ores, or other metallic compounds such as metal sulfates by a gaseous reducing agent. Here again, because of the diffusion of the components of the material to be separated throughout the pulverulent solid particles, the reaction process requires a certain period of time. Therefore, it follows that particles above a certain size and weight cannot react thoroughly within a certain time period and must be removed from the other smaller particles which have been completely reacted within that time period and the larger particles must then be discharged separately from discharge of the completely reacted particles. The mixing and reacting apparatus of the present invention is particularly suited for such a requirement because of its capacity to separate the thoroughly treated from the partially treated components.

Another process which can advantageously employ the aforedescribed mixing and reacting apparatus is the gasification or conversion of a solid material into gaseous components. As an example, coal dust can be gasified by means of steam and air or oxygen. Gasification of the coal dust nevertheless cannot take place completely for various reasons, one of which being the fact that the coal dust solids contain non-gasifiable portions, for example rock, or other impurities. Another reason is that individual coal dust particles may be too large so that they cannot be completely treated upon a single passage through the gasifier (mixing chamber). Therefore the dust solids which remain for these and other reasons, in the apparatus from the gasification process, may be withdrawn through discharge control devices 28, 32.

In processes involving other materials to be treated, due to the reaction temperatures, the remaining solids may be liquid, as for example in the case of liquid slag. Such liquid can also be discharged in liquid form by the said discharge devices 28, 32 in which connection, however, the discharge devices will be of a construction suitable for passage of hot liquids and must be maintained sufficiently hot to maintain the solids in liquid form. The discharge collecting funnel 14 on the central discharge member 12 of chamber inlet volute 8 facilitates removal of solids and particularly any liquid residium.

To further illustrate the use of the above described improved mixing and reacting method and apparatus, a description of an improved process for burning cement and constituting another embodiment of the present invention is now to be described. While specifically directed to the burning of cement, the specific process will be understood to relate broadly to other similar applications of burning or otherwise heat treating any desired material in granulated form.

The starting material for the manufacture of cement as is well-known in the art is a raw mixture of finely ground, inorganic substances. These substances will react with each other under the influence of heat applied in various successive steps and will eventually form, as a result of sintering, a final reaction product referred to as a so-called "cement clinker." This improved process is carried out so that a suitable final product is obtained, yet during the process, the greatest or most efficient possible utilization of the quantities of heat employed is accomplished.

Previously known burning processes have been normally carried out in rotary kilns, frequently coupled with separate heat exchangers. Such prior art rotary kilns, together with all their accessories, however, are not only very expensive pieces of equipment, but as pure countercurrent heat exchanger apparatus, they also have a major disadvantage in that the thermal reactions taking place in the apparatus are clearly bound to the laws of countercurrent heat exchange for which there is no substantial possibility of controlling the thermal reactions and the temperature of the individual phases of the process in the optimum manner desired. These latter mentioned disadvantages are obviated by this embodiment of the present invention since the individual phases of the process are each allowed to take place in separate apparatus, thus affording each phase of the process the conditions which are most favorable for it.

In the case of the burning of cement, there is first formed from the raw mix, small, gritlike granules which must be sufficiently firm to be able to withstand the further course of the process without being substantially damaged until the sintering occurs. The size of such particles may vary from between a few tenths of a millimeter on up, depending on the raw material and the size of the apparatus employed. Any suitable previously known method for producing granules may be employed.

The apparatus of the present invention, by which the raw mix cement granules or particles are burned, is illustrated in FIGURE 3. The uppermost unit is a countercurrent heat exchanger 100 having a flue 104 and an inlet opening 108 for introduction of the raw granules. Inserted in opening 108 at the upper end of exchanger 100 is a chute 112 enabling delivery of the raw granular material to the heat exchanger in a manner somewhat similar to delivery by the chute 52 shown in FIGURE 1. Below the innermost end, or delivery end of chute 112, is a distributing device 116 which in simple construction may be a series of diffusing baffles or any other suitable means to spread the granules across the width of the exchanger. The lower end of heat exchanger 100 tapers inwardly at 120 at a small tubular section 124. Positioned immediately below heat exchanger 100 is a treating chamber 128 of the type described with reference to FIGURES 1 and 2. The tapered lower section 120 and bottom outlet tube 124 of the heat exchanger 100 constitute a hopper for delivering material to be treated into chamber 120. Tube 124 is inserted into the central opening in the top wall of the outlet volute of a S–L form of reacting chamber 128, extending a substantial distance therethrough to deliver granulated material into the low pressure zone of the return flow stream as indicated by arrows 132. At the lower end of reaction chamber 128 (its inlet volute end) is a discharge tube 136 having a discharge control device 140 which may, for example, be a bucket wheel valve for discharging oversized particles as has been described in connection with the chamber of FIGURE 1.

Located adjacent the reaction chamber 128 and connected with the chamber outlet conduit 144 is a separating device 148, for example, a cyclone separator as shown. At the upper end of the separator 148 is a pipe 152 which conveys waste gases 156 to a line 186 which introduces hot gases into the lower end of heat exchanger 100. At the bottom end of the cyclone separator 148 is a discharge control device 157 which may be a slide or a bucket wheel similar to control device 140 and a tubular line 160 extending from the discharge device 157 connects it to a second heat exchanger 170.

The second heat exchanger 170 has a distributing device 174, similar to distributor 116, located at its upper end which diffuses the material delivered from line 160 into heat exchanger 170. The lowermost end of heat exchanger 170 is provided with an outlet conduit 178 for delivering the finished product which in this case will be cooled cement clinkers. Such clinkers are cooled by the fresh air, indicated by arrows 182, which enters the opposite side of the heat exchanger through a conduit 180 from a blower 184. A discharging device such as a worm 179 may be employed to convey the cooled cement clinkers through discharge conduit 178.

The top of the second heat exchanger 170 has opposed conduits 186 and 190 permitting exit paths for the air forced through the exchanger by blower 184. Conduit 190 extends into and becomes the inlet tube for the inlet volute 194 of the mixing (reaction) chamber 128. The second exit conduit 186 is a bypass line to feed preheated air from the heat exchanger 170 directly to the first heat exchanger 100 by the passing through a bypass control member, for example, throttle valve 198.

An auxiliary inlet 202 may be provided in conduit 186 for the introduction of materials such as ballast material or fuel which will pass through the process as heat accumulating means.

Thus it can be seen that when it is desired to thoroughly mix and burn granulated material or fine dust, the arrangement as described in FIGURE 3 can be employed. The material to be treated is first placed in chute 112 from which it is delivered to distributor 116 into the main body of heat exchanger 100 in which it is exposed in its descent to countercurrent preheated air indicated by arrows 204 arriving from line 186 and from the combustion reaction chamber 128 through outlet 144, line 156 and line 186. The particles or granules of material are thus heated in heat exchanger 100 by hot waste gas 204 from the preceding burning process carried on in chamber 128. The waste heat is thus utilized with optimum efficiency and the incoming granules of material are thereby dried and deacidified in the heat exchanger 100 in preparation for the burning process.

The predried granulated material continues to fall through the system into tube 124 into combustion chamber 128. Preheated air enters combustion chamber 128 from below as carrier gas through line 190 while, at a suitable point, fuel which is to be burned is introduced into the combustion chamber, fuel inlet pipe 192, near the top of chamber 128 in FIGURE 3, illustrating a preferred fuel introduction location. In chamber 128, under the action of the temperature produced from the burning fuel, the predried raw mix granules react and sinter together to form clinkers. The temperature distribution in the combustion chamber is such that the clinkers and hot waste gases emerging from the combustion chamber 128 through outlet 144 will have already cooled to such an extent that the granules no longer stick. If necessary, the wall of the combustion chamber can be cooled with water or the like, although the combustion occurring within the chamber does not touch the chamber wall because of the nature of the flow of the outer zone of fluid in the chamber.

The granules which may be too large, or other fragments which as a rule have not reacted sufficiently, being of a weight too great to pass out of the chamber with the exhausting gases, can be removed separately at the bottom of the combustion chamber through tube 136 and discharge control device 140. The reaction product clinkers and the waste gas are discharged from the upper end of the combustion chamber through chamber outlet 144 into the cyclone separator 148 where the clinkers and gas are separated, the waste gas shown by arrows 156 passing out through tube 152 into conduit 186 and thence into the first heat exchanger 100. The separated clinker material passes downwardly by means of control member 157 into the second heat exchanger 170 where it drops vertically downwardly to the bottom of the exchanger giving off heat in its descending path to the fresh air 182 entering through conduit 180 from blower 184. The cooled cement clinkers are removed from the heat exchanger through discharging worm 179 in conduit 178.

The air which has been preheated in heat exchanger 170 may be fed to the combustion chamber 128 through conduit 190 or, if required for the heat balance, a part of this air may also be fed directly to the first heat exchanger 100 via bypass conduit 186 through throttle control member 198.

The individual items of the heat balance can be adjusted with respect to each other by other suitable measures, for instance the addition of ballast material which passes through the process as heat accumulating means, or by the introduction of fuels at any desired point, as for instance at the secondary inlet 202. The addition of secondary air at any desired point may also be utilized for this purpose. The process may also be carried out with raw material sprayed into the apparatus in sludge form or in the form of a suspension, in which connection granulated material is formed in heat exchanger 100 by drying the droplets originally present.

Of course, as mentioned above, this method is not limited to the manufacture of cement but can advantageously be employed in the treatment of other solids.

Another feature of this invention, as shown in FIGURE 3, which bears mentioning, is the fact that a single blower unit 184 is all that is necessary to force the combustion supporting air and bypass air through the apparatus. It is obvious that additional heat exchangers in series with heat exchangers 100 and/or 170 may be employed if desired.

FIGURE 4 illustrates another embodiment of the present invention which relates to a system for subjecting granulated or powdered solids to a heat treatment. As in the embodiment described in FIGURE 3, a hot gas is employed as the heat carrier in the three stage heat treating process shown in FIGURE 4. The reaction components of each stage of the apparatus are similar to the mixing and reacting component as described in FIGURE 3, with a treating mixing chamber and cyclone separator connected thereto. As will be seen in this process, the heat treatment of solids in dust form is carried out in a plurality of stages, three being exemplarily illustrated in FIGURE 4. Of course, other physical and chemical reactions can also take place between the solids and the gas during progress through each stage.

Generally, utilizing the system illustrated in FIGURE 4 in a drying process for example, involves introducing material to be treated at the upper end of the uppermost stage through inlet 372 while a preheated heat carrier fluid (combustion products, for example) is introduced into the lowermost end of the system by means of the inlet volute 334 of treating chamber 310. The solid material progresses downwardly through stages of the system being contacted with increasingly higher temperatures in each treating mixing chamber 304, 306, and 310, unless it is desired to subject the material being treated to combustion during its treatment. Combustion, if desired, can easily be carried out in any one of the treating mixing chambers 304, 306, 310.

Each stage of the system consists of a treating mixing chamber and separator. For example, the upper stage treating mixing chamber 304 has an inlet volute 307 and an outlet volute 311 connected to cyclone separator 314 by conduit 308. The cyclone separator has an upper central outlet for the carrier fluid and a lower or bottom outlet for discharging the solid material which has been treated in chamber 304. The uppermost inlet 372, for solid material to be treated, extends into the upper end of chamber 304 so that material may be introduced into the return flow path at the core of chamber 304.

Each successive stage such as the second stage shown in FIGURE 4 is arranged to receive treated material into its treating mixing chamber, chamber 306 in the second stage, from the bottom outlet of the cyclone separator 314 of the preceding stage and, the cyclone separator 316 of the second stage has its carrier fluid outlet connected by conduit 341 to an inlet volute 307 of the first stage treating mixing chamber 304, thus utilizing hot waste gases 342 in preheating the material in the preceding stage prior to its entry into first stage cyclone separator 314 and thence into the middle treating chamber 306. The arrangement of two adjacent stages of the treating system thus far described is the same for any two adjacent stages i.e., the cyclone separator of one stage is connected to the treating mixing chamber of the other and vice versa.

It will be apparent that the material is treated in a treating chamber in each stage and after being separated from the heat carrier fluid, is passed to the treating chamber of the next stage from the separator of the preceding stage. Likewise the heat carrier fluid is passed into an inlet volute of a treating chamber and thence into an associated separator with the treated material, from which separator the heat carrier fluid is introduced into the inlet volute of the treating chamber in the next adjacent upper stage.

In addition to the components of each stage, an initial preheating chamber 324 may be used to provide hot carrier fluid. Chamber 324 has an inlet 328 and an outlet 332 and preferably is similar to the mixing chamber shown and described in FIGURES 1 and 2 for best efficiency of combustion. It may include discharge devices from its inlet volute 329, if desired, in which case it could be used as a treating chamber in the manner of the FIGURE 1 chamber. A blower 336 is connected to chamber 324 for driving the carrier fluid (combustion supporting air, for example) through chamber 324 and thence into chamber 310 and the succeeding chambers. An inlet means such as pipe 325 inserted through outlet volute 333 of chamber 324 introduces combustible fuel into chamber 324.

An outlet conduit 332 from the outlet volute 333 of preheating chamber 324 connects with an inlet volute 334 of treating chamber 310. Connected to the upper portion of treating chamber 310 is an inlet 340 extending from separator 316 into the center of outlet volute 344. An outlet conduit 348 from outlet volute 344 of treating chamber 310 extends to the cyclone separator 320 of this stage, the separator 320 having an outlet 352 at the lower end for treated solids and another outlet 356 at the upper end for carrier fluid. Outlet 356 is in communication with a conduit 360 which merges into another inlet volute 305 of treating chamber 306. Thus in each stage the material is subjected to treatment in a treating chamber and passed to a separator from which it passes out of the system as at 352, or into another stage of treatment as through conduit 340 from separator 316 extending into chamber 310.

At the outset, the material to be treated is introduced into upper chamber 304 through inlet means 372, while a heat carrier such as hot gas 364 is prepared in the preheater and circulated into chamber 310 and generally upwardly through the system. The material is first treated in chamber 304 in the manner described with the apparatus shown in FIGURES 1 and 2. This stage of treatment may consist merely of a preheating phase, since it is furthest from preheater 324 and therefore will be subjected to the coolest heat carrier of all stages in the system, or fuel may be introduced into the treating chamber for combustion to develop a higher temperature or to obtain a burning treatment. Inlet volute 307 in chamber 304 may have outlets such as 12 and 16 shown in FIGURES 1 and 2, to discharge any undesirable fractions of material being treated. In fact, any of the chambers 304, 306, and 310 may have such discharge devices to refine the final product depending upon the material being processed (it may all be usable) and the size distribution of particles desired to be excluded from the finished product.

The treated material (dust for example) passes from chamber 304 into separator 314 via outlet conduit 308. The separator discharges waste gases having passed through the entire system through member 368 while the treated material passes through conduit 369 into chamber 306 for the second treatment stage. The preheated material, after treatment in chamber 306, emerges from separator 316 of the middle stage and is introduced from above via conduit 340 into mixing chamber 310. The treated material in chamber 310 is mixed with the hot gas 364 and if desired could be caused to react with said gas in chamber 310. The hot gas which is somewhat cooled at this point of the process, and the treated material, leave the mixing chamber 310 through outlet 348 and are separated in the cyclone separator 320. The treated material which is the finished product at this stage is discharged from the system from bottom outlet 352 of separator 320 while the hot gases enter mixing chamber 306 via member 360 and inlet volute 305. The material being treated can enter mixing chamber 304 in any desired stage of aggregation, for instance as liquid, sludge, or paste, or directly in solid form in which case, however, suitable introducing devices such as nozzles, worms or chutes must be employed. Instead of cyclone separator, other conventional separating devices may be used, such as settling boxes, filters or the like.

The division of the heat treatment process in several stages in accordance with the invention affords the possibility of employing the customary measures for controlling the heat balance, such as for instance, the addition of return material or ballast material, or the subsequent combustion of fuels at a suitable place. Furthermore, this division also frequently affords advantages with respect to the dust precipitation since hot gas comes into contact, in the second and first mixing chambers, with the solid material being treated, which in most cases is still moist, so that this material takes up a part of the very fine dust which may be present in the hot gas from the last stage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A multistage apparatus for the heat treatment of solid materials in dust or granule form comprising a preheater having an outlet means, a third stage of said apparatus comprising a vertically disposed S–L type of mixing and reacting chamber which comprises a frusto-conical tubular wall with two ends and a length dimension at least one and one-half times its average diameter, a smooth uninterrupted interior wall surface throughout its length and arranged on a substantially vertical axis with its lower end being the small diameter end and having a lower inlet volute means on the lower end of said chamber connected in fluid communication to said preheater outlet means, an upper outlet volute means on the upper end of said chamber, and a solid material inlet means disposed at the upper end of said chamber, a separator having a waste gas outlet means and a solid material outlet means, said separator being connected to receive combined waste gas and solid material from said upper outlet volute of said chamber; a second stage of said apparatus comprising a second S–L type of mixing and reacting chamber constructed in the manner as defined for said third stage chamber and having a lower inlet volute means on said second stage chamber, an upper outlet volute means on said second stage chamber and an inlet means for solid material at the upper end of said second chamber, said last mentioned lower inlet volute means connected to said waste gas outlet means of the separator of said third stage, said second stage further comprising a second stage separator having a waste gas outlet means and a solid material outlet means, said upper outlet volute means of said second stage chamber being connected to said second stage separator, said solid material outlet means of said second stage separator being connected to said solid material inlet means of said third stage chamber and adapted to deliver solid materials thereinto; and a first stage of said apparatus comprising a separator and an S–L type of mixing and reacting chamber connected together, said first stage chamber constructed in the manner as defined for said third stage chamber and having an inlet volute means at the lower end thereof, an outlet volute means at the upper end thereof and an inlet means for solid material at the upper end of said first stage chamber, and said first stage separator having a solid material outlet means and a waste gas outlet means, said first stage chamber inlet means volute being connected to the waste gas outlet means of said second stage separator, and the solid material outlet means of said first stage separator connected to the solid material inlet means of said second stage chamber and adapted to deliver solid material thereinto.

2. A system for heat treating solid material comprising first, last, and at least one intermediate stage connected in series, each of said stages comprising: a vertical S–L type of reaction mixing chamber which comprises a frusto-conical tubular wall with two ends and a length dimension at least one and one-half times its average diameter, a smooth uninterrupted interior wall surface throughout its length and arranged on a substantially vertical axis with its lower end being the small diameter end and having an inlet volute means at its lower end and an outlet volute means at its upper end, and a separator having dual outlet means for respectively discharging waste gases and treated solid material and an inlet means connected to the said outlet volute means of its associated stage chamber; said S–L mixing chamber of each intermediate stage having inlet means for the introduction of solid material to be treated therein extending through the outlet volute means associated with said stage to a central position proximate the outlet end of the chamber, said solid material inlet means of at least the intermediate stages being connected to receive the treated material from the treated material outlet means of the separator in the next preceding adjacent stage, and said inlet volute means of said intermediate and first stage S–L chambers connected to receive gases from the waste gas outlet means of a separator in the next succeeding stage.

3. In a system as defined in claim 2, including a gaseous heat source, said first stage S–L chamber having an auxiliary inlet means through said outlet volute means for initial introduction of solid material into said system, and said inlet volute means of said last stage S–L chamber being connected in fluid communication to said heat source for the initial introduction of a gaseous heat carrier into said system.

4. A mixing apparatus comprising: a vertically disposed tubular frusto-conical chamber with upper and lower ends, with a length dimension at least one and one-half times its average diameter and a smooth uninterrupted interior wall surface throughout its length, the smaller end being the lower end, having an inlet opening at the lower end thereof and an outlet opening at the top, a gas inlet means secured to said chamber about said inlet opening comprising an inlet volute with upper, lower and side walls, said inlet volute having a peripheral inlet conduit in the side wall and an opening in the upper wall providing fluid communication to the inlet opening of said chamber; said volute also including central and peripheral outlet means located at its bottom; an outlet volute secured to said chamber at the outlet end thereof by a diverging frusto-conical strip, said outlet volute having a top wall, a peripheral side wall connected to said top wall, and an outlet conduit extending tangentially from said volute side wall; said outlet volute top wall having an opening therein; and an auxiliary inlet means projecting through said opening with a discharge end located approximate the center of said chamber outlet.

5. An apparatus as defined in claim 4, wherein said auxiliary inlet means comprises a tube projecting completely through said outlet volute at least to a discharge position coextensive with said chamber outlet.

6. An apparatus as defined in claim 4 wherein said inlet volute central outlet means comprises an upper funnel shaped portion and a lower discharge conduit merging with said funnel, said discharge conduit having a discharge control means therein.

7. An inlet means for a vertically disposed mixing chamber comprising an inlet volute having a substantially vertically disposed side wall and substantially horizontal top and bottom walls, an inlet conduit for said volute extending thereinto, an outlet means comprising an opening formed in the center of the top wall thereof, a second smaller central outlet means located in the bottom wall thereof concentric with said volute outlet opening comprising a funnel shaped upper portion and a tubular extension depending therefrom, and a third peripherally disposed outlet means comprising a vertically disposed depending discharge member having an opening in the upper end thereof, said opening communicating into the peripheral wall of said volute.

8. A heat treating apparatus having at least one stage comprising a heat exchanger having a solid material inlet means in the upper end thereof, a gaseous material inlet means in its lower end, a gaseous material outlet means in its upper end and a lower solids outlet means; a tubular combustion chamber being vertically disposed with smooth uninterrupted interior wall surface throughout its length and a length dimension at least one and one-half times its average diameter; said combustion chamber having an outlet volute at the upper end thereof and an inlet volute at the lower end thereof; and said heat exchanger solids outlet means extending into said combustion chamber through said outlet volute and terminating approximate the center of said upper end of said combustion chamber.

9. A heat treating apparatus comprising: a first heat exchanger having a solid material inlet means in the upper end thereof, a gaseous material inlet means in its lower end, a gaseous material outlet means in its upper end and a lower solids outlet means; a tubular combustion chamber being vertically disposed with smooth uninterrupted interior wall surface throughout its length and a length dimension at least one and one-half times its average diameter; said combustion chamber having an outlet volute at the upper end thereof and an inlet volute at the lower end thereof; said heat exchanger solids outlet means extending into said combustion chamber through said outlet volute and terminating approximate the center of said upper end of said combustion chamber; a second heat exchanger; a separator unit connected to said outlet volute of said combustion chamber for separating the combustion chamber discharge into solids and fluids, having fluid discharge means connected thereto and to said first heat exchanger gaseous material inlet means to supply separated fluid to said first heat exchanger; and a further discharge means supplying separated solid material to the upper end of said second heat exchanger; said second heat exchanger having a lower end and an upper end, an outlet means at the lower end thereof through which a final treated solid product may be discharged, a gaseous inlet means also on the lower end of said second heat exchanger for the entrance of combustion supporting gas, and a gas outlet means at the upper end of said second heat exchanger; and fluid passage means interconnecting said second heat exchanger gas outlet means with said combustion chamber inlet volute.

10. The apparatus as defined in claim 9, wherein a bypass line is provided between said gas outlet means of said second heat exchanger and said gaseous material inlet means of said first heat exchanger.

11. The apparatus as defined in claim 10, wherein said bypass line has a throttling control member, and a secondary inlet opening located therein.

References Cited in the file of this patent

UNITED STATES PATENTS

| | | |
|---|---|---|
| 503,558 | Solvay | Aug. 15, 1893 |
| 1,948,313 | Powelson | Feb. 20, 1934 |
| 2,257,907 | Griswold | Oct. 7, 1941 |
| 2,344,007 | Totzek | Mar. 14, 1944 |
| 2,391,723 | Mann | Dec. 25, 1945 |
| 2,441,613 | Balassa | May 18, 1948 |
| 2,613,450 | Nichols et al. | Oct. 14, 1952 |
| 2,659,587 | Bowen | Nov. 17, 1953 |
| 2,911,730 | Schaub et al. | Nov. 10, 1959 |
| 2,924,887 | Marshall | Feb. 16, 1960 |
| 2,956,347 | Gordan | Oct. 18, 1960 |
| 3,020,646 | Joseph et al. | Feb. 13, 1962 |